Aug. 28, 1945.   T. B. CHACE   2,383,771
DRINK DISPENSER
Filed May 19, 1944
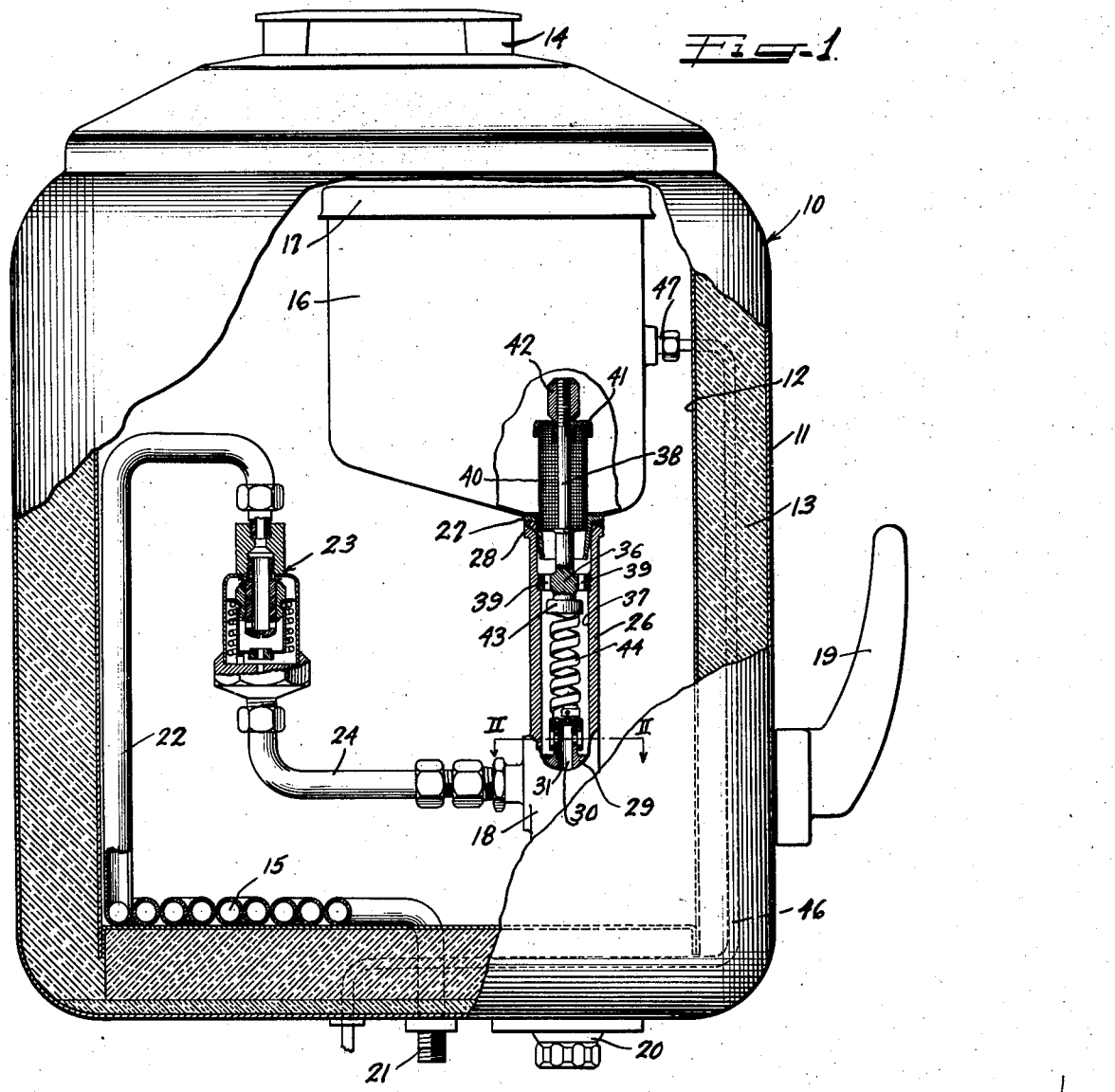
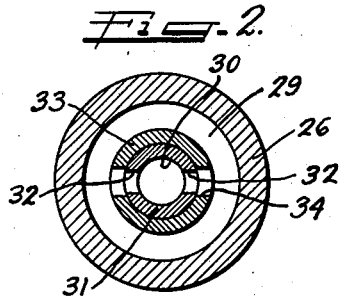
Inventor
THOMAS B. CHACE.
by Charles Still Attys.

Patented Aug. 28, 1945

2,383,771

UNITED STATES PATENT OFFICE 2,383,771

DRINK DISPENSER

Thomas B. Chace, Winnetka, Ill., assignor to The Dole Valve Company, Chicago, Ill., a corporation of Illinois Application May 19, 1944, Serial No. 536,256

8 Claims. (Cl. 225—21)

The present invention relates to improvements in dispensing devices employed in the production of mixed beverages formed by combining proportional parts or two or more liquids. More particularly, the invention pertains to the provision of temperature responsive means for controlling the quantity of at least one of the component liquids supplied to the mixing unit of a beverage dispenser in the preparation of a mixed drink.

In the production of a beverage or soft drink in which carbonated water is mixed with a flavoring syrup, it is highly desirable that the uniformity of the resulting drink be maintained with fidelity in order to prevent a variation in taste of successive drinks. The maintenance of the proper proportions of the component liquids combined to form the drink is determinative of its resulting taste and uniformity of mixture. The proportion of the liquids employed in the preparation of the drink is altered by such factors as changes in the pressure of the carbonated water and variations in the viscosity of the syrup.

In dispenser units of the type with which the present invention is particularly advantageously adapted to be employed, the carbonated water and the syrup or flavoring material is chilled by the use of a suitable cooling medium such, for example, as ice, ice and salt mixture, or the like. The syrup container which is adapted to be disposed in the cooling compartment of the dispenser unit causes the syrup to be subjected to temperatures ranging from room temperature to below 40° F. depending upon the length of time it is in the container before being dispensed. This wide variation in temperature adversely affects the viscosity of the syrup and thus causes marked variations in the rate at which the syrup flows from the container each time a drink is dispensed.

The present invention has for its object the provision of means for automatically correcting for the aforementioned varying conditions so as to insure an accurate and constant proportion of syrup to carbonated water for each drink.

The novel features which are believed to be characteristic of my invention are set forth with particularity in the appended claims. My invention itself, however, both as to its organization, method of operation and manner of construction, together with further objects and advantages thereof, may best be understood by reference to the accompanying drawing, in which:

Figure 1 is an elevation with parts in section and broken away illustrating one form of beverage dispenser units embodying the teachings of the present invention; and Figure 2 is a horizontal cross section taken along the line II—II in Figure 1.

The dispenser unit with which the teaching of the present invention is particularly advantageously adapted to be employed is indicated generally in Figure 1 of the drawing by the reference character 10. The unit 10 comprises an outer casing or cabinet 11 in which is disposed a container 12 for accommodating a suitable temperature changing medium such, for example, as ice or the like. A suitable insulating material 13 may be employed to separate the outer wall of the container 12 and the inner wall of the cabinet 11.

Access may be had to the interior of the container 12 through an opening in the top of the cabinet 11 in which a removable cap 14 is disposed. A suitable coil 15 which may advantageously be formed of tubing so as to extend from end to end of the container 12 and be supported by the bottom wall thereof provides a continuous passage for carbonated water employed in the preparation of a carbonated drink. Flavoring syrup for the preparation of such drinks is also subjected to the action of the cooling medium and is confined within the container 12 in a jar 16 which is adapted to be hermetically sealed as by means of a tightly fitting cover 17 on the uppermost end thereof.

Also disposed within the container 12 and subjected to the action of the temperature changing medium is a mixer valve 18 which is supplied with carbonated water from the coil 15 and flavoring syrup from the jar 16. The mixer valve 18 is actuated by a handle 19 disposed externally of the cabinet 11 and each manipulation of the handle 19 will dispense the proper predetermined proportions of syrup from the jar 16 and carbonated water from the coil 15 through the discharge outlet 20 in the base of the cabinet and into a suitable cup or receptacle.

The coil 15 is connected to a supply of carbonated water as by means of a detachable connection 21 to which any suitable form of conduit may be attached. The carbonated water passes through the coil 15 on the base of the container 12 and thence through the upwardly extending portion of the coil 22 which is connected to a suitable flow control device 23. The flow control device 23 operates to control the supply of carbonated water to the mixer valve 18 in such fashion that the flow of the carbonated water will remain constant in spite of pressure variations in the supply.

This control valve 23 may take any suitable form but is preferably of the type shown and described in my copending application, Serial No. 468,887, entitled "Drink dispensing devices," filed December 14, 1942.

A suitable connection 24 is adapted to connect the outlet 25 of the flow control unit 23 with the mixer valve 18. The mixer valve 18 is provided with an extension or standpipe 26 which is open at its uppermost end to receive the tapered collar 27 secured to the base of the syrup jar 16. A suitable gasket 28 may be inserted between the collar 27 and the open end of the standpipe 26 to afford a tight joint therebetween and to prevent leakage of the syrup from the jar 16.

In the base of the standpipe 26 and adjacent the point at which it merges with the casing of the mixing valve 18 is disposed an insert 29 having a centrally disposed bore 30 which extends axially of the insert 29 and an integrally formed stem portion 31 thereon. The stem portion 31 is provided with a pair of substantially diametrically disposed openings 32 extending radially through the wall thereof and communicating with the bore 30. A cap 33 closed at its uppermost end extends downwardly over the open end of the stem portion 31 so as to close off the end of the bore 30 therein. The cap 33 is provided with apertures 34 disposed diametrically opposite each other and extending radially through the wall thereof so positioned that they will register with the openings 32 in the wall of the stem portion 31.

Adjacent the uppermost end of the standpipe 26 and just below the end of the collar 27 of the syrup jar 16 extending thereinto is disposed an annular member 36 which may be threaded into or otherwise suitably secured in the internal bore 37 of the standpipe 26. The annular member 36 has a substantially centrally disposed stem portion 38 extending axially of the collar 27 into the interior of the jar 16 when the parts are assembled as indicated in Figure 1.

A plurality of apertures 39 is provided in the annular member 36 extending axially thereof and arranged about the base of the stem portion 38 to permit the passage of the syrup contained in the jar 16 through the bore 37 of standpipe 26 in the direction of the insert 29. A generally cylindrical screen 40 may be inserted in the upper end of the collar 27 and held in place by means of a cap 41 supported by the stem portion 38 and demountably secured in place as by means of a nut 42 threaded onto the upper end of the stem portion 38. The screen 40 is adapted to prevent the passage of any foreign material which might be disposed in the syrup in the jar 16 into the bore 37 of the standpipe 26.

A boss portion 43 is provided on the opposite face of the annular member 36 from the stem portion 38 thereon and forms a mounting for one end of a spirally formed bimetallic thermostatic element 44 which extends longitudinally of the bore 37 of the standpipe 26. The other end of the thermostatic element 44 is secured in any suitable fashion to the closed end of the cap 33 which is mounted upon the stem portion 31 of the insert 29. The thermostatic element 44 is responsive to changes in temperature of the syrup contained in the bore 37 of the standpipe 26 and is thereby enabled to adjust the positions of the openings 34 in the wall of the cap 33 with respect to openings 32 in the stem portion 31.

The relationship of the openings 32 with respect to the openings 34 is predetermined depending upon the known viscosity characteristics of the flavoring syrup contained in the syrup jar 16 for use in the production of the beverage in combination with carbonated water. The relative sizes and the original disposition of the two pairs of openings 32, 34 with respect to each other is originally determined by the particular type of flavoring syrup employed and, thereafter, the thermostatic element 44 will adjust the relative positions of the two pairs of openings in accordance with temperature variations in the supply of the syrup which directly affects the viscosity thereof.

In the operation of the dispenser unit 10, the operator manipulates the handle 19 which actuates the mixing valve 18 to discharge a predetermined proportional amount of carbonated water from the coil 15 together with a measured quantity, or slug, of syrup from the standpipe 26 for discharge through the outlet 20 into a glass, cup or other receptacle. The flow control device 23 inserted in the upwardly projecting portion 22 of the cooling coil 15 and connected to the mixing valve 18 by the connection 24 controls the exact quantity of carbonated water and maintains it uniform throughout the operation of the device irrespective of pressure variations occurring in the supply of the carbonated water admitted to the cooling coil 15 through the connection 21.

Likewise, the thermostatic element 44 is caused to coil or uncoil depending upon variations in temperature in the syrup supply disposed in the bore 37 of the standpipe 26 so as to control the extent to which the openings 34 will register with the openings 32 communicating with the bore 30 of the insert 29 admitting syrup to the mixing valve 18. It will thus be seen that, under all conditions of temperature and pressure, a completely uniform quantity of carbonated water and flavoring syrup will at all times be supplied to the mixing valve 18 thereby insuring a carbonated beverage of uniform taste at all times.

To facilitate the uniformity in the flow of the relatively viscous syrup from the syrup jar 16 it may be desirable to employ a means of applying pressure on the syrup. To this end a tubing 46 which is disposed within the insulating material 13 has been shown in Figure 1 being provided with a suitable coupling means having a separable connector 47 for coupling the tube to the wall of the syrup jar 16. The tubing 46 is adapted to extend through the base of the cabinet 11 and have its projecting end provided with a suitable means for interconnection with the carbon dioxide cylinder (not shown) which supplies the carbonation for the carbonated water introduced to the coil 15. In this way, a slight pressure may be applied to the upper surface of the syrup supply in the jar 16 sealed by the cover member 17 sufficient to cause the syrup to flow uniformly through the collar 27 and into the bore 37 of the standpipe 26.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A dispensing device or the like for producing a beverage composed of proportional parts of at least two different liquids, said device comprising a mixing valve, individual means supplying each of the liquids to the mixing valve, said mixing valve combining the liquids in predetermined proportions to produce the beverage, an insulated cabinet containing a temperature changing medium and housing the mixing valve and supply means for subjecting the liquids to the action of the temperature changing medium, and temperature responsive means for at least one of the supply means for controlling the quantity of liquid supplied by said supply means to the mixing valve.

2. A dispensing device or the like for producing a mixture of proportional parts of at least two different liquids, said device comprising a supply source for each liquid, a mixing means for receiving liquid from each of said sources and combining said liquids in predetermined proportions to form a uniform mixture, a container confining a temperature changing medium and housing the mixing means and at least one of the supply sources and subjecting said mixing means and said supply source to the action of the temperature changing medium, means co-operating with the supply source in the container to control the quantity of liquid supplied to the mixing means, and temperature responsive means for regulating the control means in accordance with the changes in the temperature of the liquid imparted thereto by the temperature changing medium.

3. A dispensing device or the like for producing a mixture of proportional parts of at least two different liquids, said device comprising a supply source for each liquid, a mixing means for receiving liquid from each of said sources and combining said liquids in predetermined proportions to form the ultimate mixture, a container confining a temperature changing medium and housing the mixing means and at least one of the supply sources, to subject the same to the action of the temperature changing medium, means associated with the supply source in the container to control the quantity of liquid supplied to the mixing means, means applying a pressure on at least one of the liquid supply sources, and temperature responsive means for regulating the control means in accordance with the changes in the temperature of the liquid imparted thereto by the temperature changing medium.

4. A dispenser unit for carbonated beverages containing carbonated water and flavoring syrup comprising a source of carbonated water, a cooling coil for the carbonated water, a container for syrup, a mixing valve for combining predetermined proportional parts of carbonated water and syrup, a cooling cabinet housing the syrup container, the cooling coil, and the mixing valve, and thermostatically controlled valve means between the syrup container and the mixing valve for controlling the delivery of a uniform quantity of syrup from the container to the mixing valve irrespective of changes in the viscosity of the syrup caused by variations in the temperature thereof.

5. A dispenser unit for carbonated beverages containing carbonated water and flavoring syrup comprising a source of carbonated water, a cooling coil for the carbonated water, a container for syrup, a mixing valve for combining predetermined proportional parts of carbonated water and syrup, a cooling cabinet housing the syrup container, the cooling coil, and the mixing valve, means applying pressure to the syrup in the container, and thermostatically controlled valve means between the syrup container and the mixing valve for controlling the delivery of a uniform quantity of syrup from the container to the mixing valve irrespective of changes in the viscosity of the syrup caused by variations in the temperture thereof.

6. A dispenser unit for carbonated beverages containing carbonated water and flavoring syrup comprising a source of carbonated water, a cooling coil for the carbonated water, a container for syrup, a mixing valve for combining predetermined proportional parts of carbonated water and syrup, a cooling cabinet housing the syrup container, the cooling coil, and the mixing valve, means defining an open-ended passage connecting the syrup container and the mixing valve, control means in the passage for opening and closing one end thereof to the flow of syrup from the container to the mixing valve, and a bimetal thermostat in the passage responsive to changes in temperature of the syrup for adjusting the control means.

7. A dispenser unit for carbonated beverages containing carbonated water and flavoring syrup comprising a source of carbonated water, a cooling coil for the carbonated water, a container for syrup, a mixing valve for combining predetermined proportional parts of carbonated water and syrup, a cooling cabinet housing the syrup container, the cooling coil, and the mixing valve, means defining an open-ended passage connecting the syrup container and the mixing valve, means applying pressure to the syrup in the container to facilitate the flow of the syrup through the passage, control means in the passage for opening and closing one end thereof to the flow of syrup from the container to the mixing valve, and a bimetal thermostat in the passage responsive to changes in temperature of the syrup for adjusting the control means.

8. In a dispenser device for producing carbonated beverages from a mixture of carbonated water and flavoring syrup in predetermined proportional parts, means for insuring a uniform quantity of syrup for each drink comprising a source of supply for said syrup, means supplying the carbonated water, means maintaining a constant rate of delivery of the carbonated water, and thermostatically controlled valve means for regulating the delivery of syrup from the syrup supply.

THOMAS B. CHACE.